(12) United States Patent
Fujimori et al.

(10) Patent No.: US 11,232,885 B2
(45) Date of Patent: Jan. 25, 2022

(54) INSULATED WIRE, METHOD OF PRODUCING INSULATED WIRE, COIL, ROTATING ELECTRICAL MACHINE, AND ELECTRICAL OR ELECTRONIC EQUIPMENT

(71) Applicant: ESSEX FURUKAWA MAGNET WIRE JAPAN CO., LTD., Tokyo (JP)

(72) Inventors: Kenji Fujimori, Tokyo (JP); Makoto Oya, Tokyo (JP)

(73) Assignee: ESSEX FURUKAWA MAGNET WIRE JAPAN CO., LTD., Tokyo (JP)

( * ) Notice: Subject to any disclaimer, the term of this patent is extended or adjusted under 35 U.S.C. 154(b) by 0 days.

(21) Appl. No.: 15/963,667

(22) Filed: Apr. 26, 2018

(65) Prior Publication Data

US 2018/0247732 A1 Aug. 30, 2018

Related U.S. Application Data

(63) Continuation of application No. PCT/JP2016/081809, filed on Oct. 27, 2016.

(30) Foreign Application Priority Data

Oct. 28, 2015 (JP) .............................. JP2015-212290

(51) Int. Cl.
*H01B 5/02* (2006.01)
*H01B 7/02* (2006.01)
(Continued)

(52) U.S. Cl.
CPC ........... *H01B 7/0275* (2013.01); *H01B 3/306* (2013.01); *H01B 3/308* (2013.01); *H01B 7/0208* (2013.01);
(Continued)

(58) Field of Classification Search
CPC .................................... H01B 7/08; H01B 5/02
(Continued)

(56) References Cited

U.S. PATENT DOCUMENTS 3,528,852 A * 9/1970 Arndt ..................... H01B 3/308
174/117 FF
5,965,263 A * 10/1999 Tatematsu ............ C09D 179/08
174/110 PM
(Continued)

FOREIGN PATENT DOCUMENTS

CN 101783214 A 7/2010
CN 103650065 A 3/2014
(Continued)

OTHER PUBLICATIONS

International Search Report issued in PCT/JP2016/081809 (PCT/ISA/210), dated Dec. 6, 2016.
(Continued)

*Primary Examiner* — Chau N Nguyen
(74) *Attorney, Agent, or Firm* — Birch, Stewart, Kolasch & Birch, LLP

(57) ABSTRACT

An insulated wire having at least one layer of coating of the wire, comprising a thermosetting resin layer, at the outer periphery of a conductor, wherein the thermosetting resin layer is comprised of thermosetting resin layers having a laminated structure formed by coating and baking a thermosetting resin varnish; and wherein, in said laminated structure, an innermost layer having contact with the conductor comprises a thermosetting resin having an imide bond and is a layer having an average thickness of more than 5 μm and 10 μm or less; a method of producing the insulated wire; a coil; a rotating electrical machine; and an electrical or electronic equipment.

14 Claims, 3 Drawing Sheets

(51) Int. Cl.
*H01F 5/06* (2006.01)
*H01F 27/28* (2006.01)
*H01B 3/30* (2006.01)
*H02K 3/34* (2006.01)
*H01B 13/06* (2006.01)
*H02K 3/30* (2006.01)
*H01B 13/10* (2006.01)
*H01B 13/14* (2006.01)
*H01F 27/32* (2006.01)

(52) U.S. Cl.
CPC ......... *H01B 13/065* (2013.01); *H01B 13/106* (2013.01); *H01B 13/14* (2013.01); *H01F 5/06* (2013.01); *H01F 27/28* (2013.01); *H01F 27/32* (2013.01); *H02K 3/30* (2013.01); *H02K 3/34* (2013.01)

(58) Field of Classification Search
USPC ................ 174/119 C, 119 R, 117 FF, 120 R
See application file for complete search history.

(56) References Cited

U.S. PATENT DOCUMENTS

| | | | | |
|---|---|---|---|---|
| 6,680,120 | B1* | 1/2004 | Nagel | C08K 5/29 |
| | | | | 174/110 N |
| 8,629,352 | B2* | 1/2014 | Ando | H01B 3/006 |
| | | | | 174/110 A |
| 8,686,291 | B2* | 4/2014 | Kikuchi | C09D 179/08 |
| | | | | 174/110 N |
| 9,378,863 | B2* | 6/2016 | Yoshida | C08G 73/1071 |
| 9,530,536 | B2* | 12/2016 | Fujimoto | H01B 3/421 |
| 9,536,636 | B2* | 1/2017 | Ikeda | H01B 3/306 |
| 2011/0048766 | A1* | 3/2011 | Kikuchi | C08G 73/1035 |
| | | | | 174/110 SR |
| 2011/0171368 | A1* | 7/2011 | Goto | H01B 13/065 |
| | | | | 427/117 |
| 2013/0037304 | A1 | 2/2013 | Ikeda et al. | |
| 2014/0020929 | A1 | 1/2014 | Hisada et al. | |
| 2014/0065418 | A1* | 3/2014 | Kikuchi | H01B 7/0225 |
| | | | | 428/370 |
| 2014/0299350 | A1 | 10/2014 | Kikuchi et al. | |
| 2014/0354394 | A1 | 12/2014 | Oya et al. | |
| 2015/0221412 | A1* | 8/2015 | Caudill | H01B 3/427 |
| | | | | 428/339 |
| 2015/0325333 | A1 | 11/2015 | Muto et al. | |
| 2016/0307663 | A1 | 10/2016 | Ikeda et al. | |
| 2016/0307664 | A1 | 10/2016 | Obika et al. | |

FOREIGN PATENT DOCUMENTS

| | | |
|---|---|---|
| JP | 2009-123418 A | 6/2009 |
| JP | 2013-105566 A | 5/2013 |
| JP | 2014-22290 A | 2/2014 |
| JP | 5454804 B2 | 3/2014 |
| WO | WO 2014/123123 A1 | 8/2014 |
| WO | WO 2015/098638 A1 | 7/2015 |
| WO | WO 2015/098639 A1 | 7/2015 |

OTHER PUBLICATIONS

Written Opinion of the International Searching Authority issued in PCT/JP2016/081809 (PCT/ISA/237), dated Dec. 6, 2016.
Extended European Search Report dated Apr. 30, 2019, for corresponding European Application No. 16859872.0.
Chinese Office Action and Search Report for corresponding Chinese Application No. 201680054886.5, dated Jul. 14, 2020, with English translation of the Office Action.
Japanese Office Action for corresponding Japanese Application No. 2020-11812, dated Mar. 30, 2021, with English translation.

* cited by examiner

INSULATED WIRE, METHOD OF PRODUCING INSULATED WIRE, COIL, ROTATING ELECTRICAL MACHINE, AND ELECTRICAL OR ELECTRONIC EQUIPMENT

CROSS-REFERENCE TO RELATED APPLICATIONS

This application is a Continuation of PCT International Application No. PCT/JP2016/081809 filed on Oct. 27, 2016, which claims priority under 35 U.S.C. § 119 (a) to Japanese Patent Application No. 2015-212290 filed in Japan on Oct. 28, 2015. Each of the above applications is hereby expressly incorporated by reference, in its entirety, into the present application.

TECHNICAL FIELD

The present invention relates to an insulated wire, a method of producing the insulated wire, a coil, a rotating electrical machine, and an electrical or electronic equipment.

BACKGROUND ART

In the coils for the electrical or electronic equipment including inverter-related equipment, such as high-speed switching devices, inverter motors, transformers, and the like, there are used insulated electric wires (insulated wires) composed of so-called enamel wires, insulated wires having multi-covering layers including an enamel layer (enamel-baked layer) composed of a thermosetting resin layer and an extruded covering layer composed of a thermoplastic resin layer (for example, please refer to Patent Literature 1), and the like, as a magnet wire.

On the other hand, size reduction of the electrical equipment represented by motors or transformers has been progressed in recent years. For rotating machines, such as motors, for example, there are used rectangular conductors which are advantageous for enhancement in a ratio (space factor) of a cross-sectional area of the conductor to a cross-sectional area of the stator slot.

For these insulated wires, suppression of deterioration due to partial discharge stemming from inverter surge is required. In order to suppress such deterioration, it is important to increase a partial discharge inception voltage (PDIV). However, a method of increasing a thickness of the covering resin layer of the insulated wire has the drawback of lowering a space factor thereof. For this reason, even in a case where an average thickness of the covering resin layer is the same, a method of adjusting a corner thickness and a flat portion thickness of the insulating covering layer to a particular relation between them has been proposed (please refer to Patent Literature 2).

CITATION LIST

Patent Literatures

Patent Literature 1: Japanese Patent No. 5454804
Patent Literature 2: JP-A-2013-105566 ("JP-A" means unexamined published Japanese patent application)

SUMMARY OF INVENTION

Technical Problem

The inventors of the present invention have conducted studies of only using an enamel layer as a covering resin layer of the insulated wire. In this case, thickening of the enamel layer is necessary at minimum, in order to make the withstand voltage of the insulated wire higher.

However, because the enamel layer is formed by repeatedly coating and baking a thermosetting resin varnish, in a case where, for example, a 3 μm-thick layer is formed by once-coating and baking, 30 times or more of repetition become necessary, in order to form a thick enamel layer as much as 100 μm, which results in increase of manufacturing load.

Added to this, it was found by studies of the inventors of the present invention that adhesiveness between the conductor and the enamel layer deteriorates. Furthermore, in a case where the thickness of the layer to be formed once was increased in order to decrease the frequency of coating and baking, it was found that the enamel layer itself is easy to peeling from the laminated layers. As an analysis result of this cause, it was found that the larger the number of layers each having a thickness of 5 to 10 μm each of which is formed once becomes, the more frequently the cross-sectional dog-bone-shaped coating is formed. Note that the dog-bone shape means a swelled shape in terms of the thickness of the corner in the insulated wire using a rectangular conductor.

Further, in the case of the insulated wire, it has been found that enhancement of the resistance to oils, such as an automatic transmission oil (ATF oil: automatic transmission fluid), is required.

Accordingly, the present invention is contemplated for providing: an insulated wire, which has a high adhesiveness between a conductor and an enamel layer and between laminated enamel layers, and which is excellent in ATF resistance; a method of producing said insulated wire; and a coil; a rotating electrical machine; and an electrical or electronic equipment, each of which uses said insulated wire.

Solution to Problem

The inventors of the present invention conducted a wide variety of studies on formation of the enamel layer. When forming the enamel layer by repeatedly coating and baking a thermosetting resin varnish, consideration was made for a change in the thickness of the layer to be formed by once-coating and baking, a change in the thickness between each of layers laminated by the repeated coating and baking, and the like, which resulted in the present invention.

That is, the problems of the present invention were solved by the following structures.

(1) An insulated wire having at least one layer of coating of the wire, comprising a thermosetting resin layer, at the outer periphery of a conductor,
wherein the thermosetting resin layer is comprised of thermosetting resin layers having a laminated structure formed by coating and baking a thermosetting resin varnish; and wherein, in said laminated structure, an innermost layer having contact with the conductor comprises a thermosetting resin having an imide bond and is a layer having an average thickness of more than 5 μm and 10 μm or less.

(2) The insulated wire described in the item (1), wherein a ratio of an average thickness of the innermost layer having contact with the conductor to a total thickness of the thermosetting resin layers is from 5 to 10%.

(3) The insulated wire described in the item (1) or (2), wherein the conductor is a rectangular conductor whose cross-sectional shape perpendicular to the longitudinal direction thereof is rectangular; and wherein, in the thickness of the innermost layer having contact with the conductor and locating on 4 sides that constitute a rectangle as the cross-sectional shape of said conductor, a thickness on both ends of at least one side excluding corners of the conductor is thicker than a thickness on a central part of said side.

(4) The insulated wire described in any one of the items (1) to (3), wherein the conductor is a rectangular conductor whose cross-sectional shape perpendicular to the longitudinal direction thereof is rectangular; and wherein a thickness of the innermost layer having contact with the conductor and locating on at least one corner portion of 4 corners that constitute a rectangle as the cross-sectional shape of said conductor is thinner than an average thickness on a side portion of the conductor.

(5) The insulated wire described in any one of the items (1) to (4), wherein the laminated structure of the thermosetting resin layers has laminated layers composed of at least 2 layers each having a thickness of 5 μm or less at the outer periphery of the innermost layer having contact with the conductor.

(6) The insulated wire described in any one of the items (1) to (5), wherein a total thickness of the thermosetting resin layers is from 30 to 130 μm.

(7) The insulated wire described in any one of the items (1) to (6), further comprising at least one thermoplastic resin layer having a thickness of 30 to 130 μm on the thermosetting resin layers.

(8) A method of producing an insulated wire having at least one layer of coating of the wire, comprising a thermosetting resin layer at the outer periphery of a conductor, comprising a coating and baking step of repeating 2 times or more a step of coating and baking the same or different kind of a thermosetting resin varnish at the outer periphery of the conductor, wherein at a first step of coating and baking the thermosetting resin varnish, a varnish of a thermosetting resin having an imide bond is used to form a layer having an average thickness of more than 5 μm and 10 μm or less, and then a step of coating and baking a varnish of a thermosetting resin that is the same or different from said thermosetting resin having an imide bond is carried out, to thereby form a thermosetting resin layer having a laminated structure of 2 or more layers.

(9) The method of producing the insulated wire described in the item (8), further forming a thermoplastic resin layer by extrusion-forming of a composition comprising a thermoplastic resin on the thermosetting resin layer having the laminated structure.

(10) A coil, containing any one of the insulated wire described in any one of the items (1) to (7), and the insulated wire produced by the method described in the item (8) or (9).

(11) A rotating electrical machine, comprising the coil described in the item (10).

(12) An electrical or electronic equipment, having the coil described in the item (10).

In the description of the present invention, any numerical expressions in a style of " . . . to . . . " will be used to indicate a range including the lower and upper limits represented by the numerals given before and after "to", respectively.

Further, in the description of the present invention, an enamel layer (thermosetting resin layer) is formed by repeating 2 times or more a step of coating and baking the same or different kind of a thermosetting resin varnish. In this regard, even if the same resin varnish is used, the layer formed by once-coating and baking thereof is also counted as one layer. In this way, the enamel layer is understood as a laminated structure in which the same number of layers as the number of repetition is laminated. Note that the number of repetition can be confirmed by means of an optical microscope or a microscope, after edging the cross section of the enamel layer.

In the description of the present invention, with respect to the cross-sectional shape perpendicular to the longitudinal direction of the insulated wire, the shape of a conductor integrated with a coating of the wire including an enamel layer is sometimes called simply as a cross-sectional shape. As for the cross-sectional shape in the present invention, simply not only a cutting plane has a particular shape, but also this cross-sectional shape is successively linking up to the longitudinal direction of the entire insulated wire. Unless otherwise specified, the cross-sectional shape in the present invention means that, with respect to any portion in the longitudinal direction of the insulated wire, the cross-sectional shape perpendicular to this direction is the same.

Effects of Invention

According to the present invention, it is possible to provide: an insulated wire, which has a high adhesiveness between a conductor and an enamel layer and between laminated enamel layers, and which is excellent in ATF resistance; a method of producing said insulated wire; and a coil; a rotating electrical machine; and an electrical or electronic equipment, each of which uses said insulated wire.

In this regard, from the fact that if an innermost layer of the enamel layer having contact with the conductor is thicken, a solvent for a resin varnish remains in a coating after baking, it is believed that a heat quantity applied to the subsequent baking is consumed, for evaporation of the solvent, and consequently a cure degree of the resin becomes low, and thereby enhancing adhesiveness between the conductor and the enamel layer.

Other and further features and advantages of the invention will appear more fully from the following description, appropriately referring to the accompanying drawings.

MODE FOR CARRYING OUT THE INVENTION

<<Insulated Wire>>

The insulated wire of the present invention has at least one layer of coating of the wire containing a thermosetting resin layer that is an enamel layer at the outer periphery of a conductor.

In the insulated wire, any layers other than the thermosetting resin layer may be provided. Such layers include a thermoplastic resin layer.

In the present invention, at the outer periphery of the conductor, only a thermosetting resin layer may be provided, or on the thermosetting resin layer, a thermoplastic resin layer that is thinner than the thermosetting resin layer may be provided. However, to provide only a thermosetting resin layer is preferable in particular.

Note that provision of the thermoplastic resin layer allows improvement in ATF resistance of the insulated wire.

<Conductor>

As the conductor that can be used in the present invention, use may be made of any conductor that is usually used in insulated wires, and examples thereof include a metal conductor, such as a copper wire and an aluminum wire. The conductor that can be used in the present invention is preferably a copper conductor, and a copper to be used is preferably a low-oxygen copper whose oxygen content is 30 ppm or less, and furthermore preferably a low-oxygen copper whose oxygen content is 20 ppm or less or oxygen-free copper. In a case where the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

Further, in a case where the conductor is aluminum, based on a consideration of a required mechanical strength, various aluminum alloys may be used depending on the intended use. For example, for such a use as a rotating electrical machine, it is preferred to use a 99.00% or more-grade pure aluminum by which a high current value can be obtained.

The cross-sectional shape perpendicular to the longitudinal direction of the conductor that can be used in the present invention is not limited in particular. Examples of the conductor include a conductor having a circular or rectangular cross-sectional shape. In the present invention, a conductor having a rectangular (rectangular-shaped) cross-sectional shape, that is, a rectangular conductor is preferable. The conductor whose cross-sectional shape is rectangular has higher space factor with respect to the stator slot at the time of winding, compared to a round conductor. For this reason, this type of conductor is desirable for use in, for example, a case where a lot of insulated wires are embedded in a predetermined narrow space.

Figure 1:
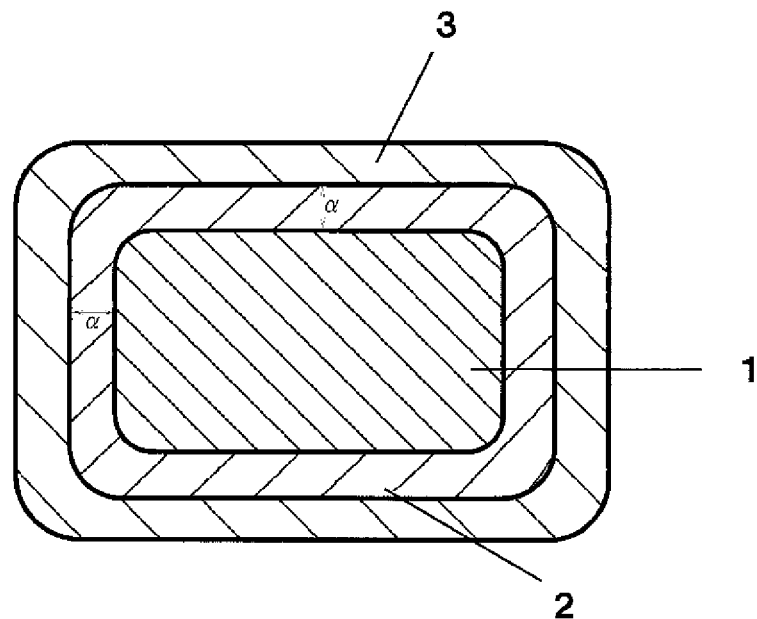
FIG. 1 is a schematic cross-sectional view showing a preferred embodiment of the insulated wire of the present invention.

In view of suppressing a partial discharge from a corner portion, the conductor whose cross-sectional shape is rectangular has preferably such a shape that chamfered edges (curvature radius r) are provided at four corners as shown in FIG. 1. The curvature radius r is preferably 0.6 mm or less and more preferably in a range from 0.2 to 0.4 mm.

The size of the conductor is not particularly limited. In the case of the rectangular conductor, in the rectangular cross-sectional shape, the width (long side) thereof is preferably from 1 to 5 mm, and more preferably from 1.4 to 4.0 mm, and the thickness (short side) is preferably from 0.4 to 3.0 mm, and more preferably from 0.5 to 2.5 mm. The ratio of length of the width (long side) to the thickness (short side) is preferably from 1:1 to 1:4. To the contrary, in the case of a conductor whose cross-sectional shape is roundly, the size is preferably 0.3 to 3.0 mm, and more preferably 0.4 to 2.7 mm, in terms of a diameter.

<Thermosetting Resin Layer>

In the present invention, a thermosetting resin layer is provided in contact with a conductor and at the outer periphery of the conductor.

The thermosetting resin layer is formed by a coating and baking step of coating and baking a thermosetting resin varnish. Ordinarily, a thermosetting resin layer having an aimed thickness is formed by repeated coating and baking.

In the present invention, because even if the coating and baking are repeated with the same thermosetting resin varnish, a layer formed by once-coating and baking is counted as one layer, the thermosetting resin layer is a laminated thermosetting resin layer in which more than one layer are laminated.

(Thermosetting Resin)

In the present invention, of the thermosetting resin layers having a laminated structure, an innermost layer having contact with the conductor contains a thermosetting resin having an imide bond.

To make the thermosetting resin having an imide bond contain in the innermost layer allows for improvement in adhesive force with the conductor and interlayer adhesive force between the thermosetting resin layers.

As the thermosetting resin having an imide bond, any form thereof is permissible, as long as it is a thermosetting resin having an imide bond.

Specific examples thereof include: polyimide (PI), polyamideimide (PAI), polyetherimide (PEI), and polyesterimide (PEsI). These resins may be used singly or in combination thereof.

In the present invention, the polyimide (PI), the polyamideimide (PAI), and the polyetherimide (PEI) are preferable.

The polyimide is not particularly limited, but use may be made of: any of usual polyimide resins, such as a whole aromatic polyimide and a thermosetting aromatic polyimide. Alternatively, use may be made of polyimides obtained by a usual method in which an aromatic tetracarboxylic dianhydride and an aromatic diamine compound are reacted in a polar solvent to obtain a polyamide acid solution, and then the obtained polyamide acid solution is subjected to imidization by a thermal treatment at the time of baking.

Examples of the polyimide (PI) include: trade name, U-IMIDE, manufactured by Unitika Ltd.; trade name, U-VARNISH, manufactured by Ube Industries, Ltd.; and trade name, #3000, manufactured by DU PONT-TORAY CO., LTD.

The polyamide (PAI), when compared to the other resins, has a lower thermal conductivity and a higher dielectric breakdown voltage, and a bake-setting can be conducted. The polyamideimide is not particularly limited. Examples thereof include: polyamideimides obtained by a usual method, for example, a method in which a tricarboxylic anhydride and a diisocyanate compound are directly reacted in a polar solvent, or a method in which a diamine compound is reacted with a tricarboxylic anhydride in a polar solvent, to previously introduce an imide bond to the reaction product, and then the reaction product is subjected to amidation using a diisocyanate compound.

Examples of the polyamideimide (PAI) include: trade name, HI 406, manufactured by Hitachi Chemical Co., Ltd., and the like.

The polyetherimide (PEI) is permissible, as long as it is a thermosetting resin having an ether bond and an imide bond in the molecule. For example, it is also possible to use a product obtained by using a polyamidic acid solution obtained by reacting, in a polar solvent, an aromatic tetracarboxylic acid dianhydride and an aromatic diamine having an ether bond in the molecule, and by subjecting the polyamidic acid solution to imidization due to a heating treatment for baking in the covering step.

Examples of the polyetherimide (PEI) include: trade name, ULTEM1000, manufactured by SABIC, and the like.

The polyesterimide (PEsI) is not particularly limited, as long as it is a polymer having an ester bond and an imide bond in the molecule, and it is thermosetting. For example, it is also possible to use a product obtained by forming an imide bond from a tricarboxylic acid anhydride and an amine compound, and forming an ester bond from an alcohol and a carboxylic acid or an alkyl ester thereof, and making a free acidic group or anhydride group of the imide bond join in the ester formation reaction. As such a polyesterimide, for example, it is also possible to use a product obtained by reacting a tricarboxylic acid anhydride, a dicarboxylic acid compound or its alkyl ester, an alcohol compound, and a diamine compound, in accordance with a known method.

Examples of the polyesterimide (PEsI) include: trade name: Neoheat8600A, manufactured by Toutoku Toryo Co., Ltd., and the like.

As the thermosetting resin that constitutes a layer other than the innermost layer having contact with the conductor, of the thermosetting resin layers having the layered structure, any of form is permissible, as long as it is a thermosetting resin.

In addition to the thermosetting resin having an imide bond, examples thereof include: a polyurethane (PU), a thermosetting polyester (PEst), a Class H polyester (HPE), a polyimidehydantoin-modified polyester, a polyhydantoin, a polybenzimidazole, a melamine resin, and an epoxy resin.

In the present invention, polyimide (PI), polyamideimide (PAI), polyetherimide (PEI), and polyesterimide (PEsI) are preferred; and polyimide (PI), polyamideimide (PAI), and polyetherimide (PEI) are more preferred.

Each layer of the laminated structure may be composed of the same thermosetting resin or a different thermosetting resin from each other. However, in the present invention, in particular, the same thermosetting resin as the resin to be used in the innermost layer having contact with the conductor is preferable.

(Thickness of Thermosetting Resin Layer and Cross-sectional Shape)

Hereinafter, in order of a thickness of the innermost layer having contact with the conductor and a cross-sectional shape, the thickness and the cross-sectional shape of the thermosetting resin layer are described.

[Thickness of Innermost Layer having Contact with Conductor and Cross-sectional Shape]

In the present invention, of the laminated thermosetting resin layers, an average thickness of the innermost layer having contact with the conductor is more than 5 μm and 10 μm or less, preferably 5.5 μm or more and 10 μm or less, and more preferably 6 μm or more and 10 μm or less.

Herein, in a case where the cross-sectional shape of the conductor is rectangular, in the present invention, it is preferable that a cross-sectional shape of the surface on the opposite side of the conductor to the innermost layer having contact with the conductor is a rectangle similar to the conductor, as schematically shown in FIG. 1. In FIG. 1, in the innermost layer 2 having contact with the conductor, the side of the conductor 1 and the side of the conductor opposite to said innermost layer 2 having contact with the conductor is constant in distance cc. In this case, the thickness of the innermost layer having contact with the conductor is within a range of from more than 5 μm to 10 μm or less in terms of average thickness. However, the thickness of the thinnest portion may be 5 μm or less.

Figure 6:
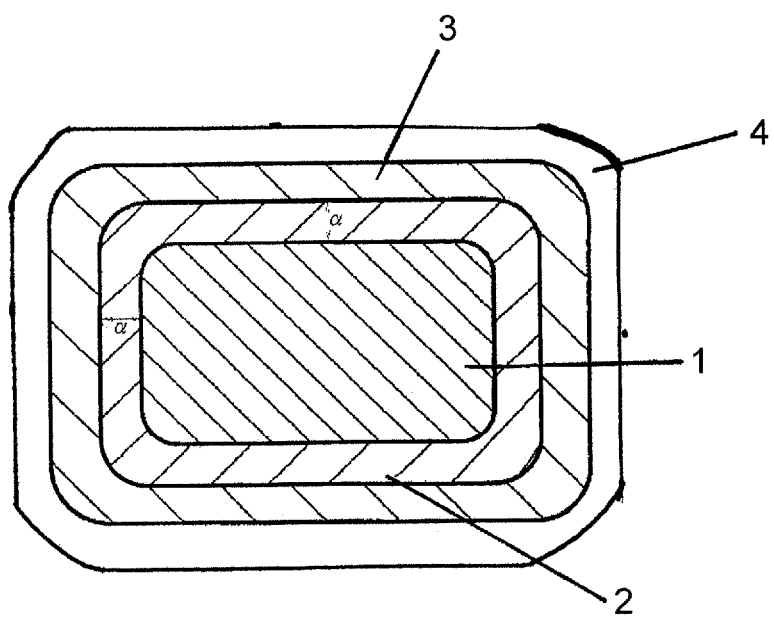
FIG. 6 is a schematic cross-sectional view showing another embodiment of the insulated wire of the present invention.

In this regard, FIG. 1 shows a remaining portion 3 laminated at the outer periphery of the innermost layer 2 having contact with the conductor 1. However, said portion 3 may be a single layer or a multi-layered laminate. Further, if necessary, a thermoplastic resin layer 4 may be provided on this thermosetting resin layer, which is omitted in FIG. 1 but shown in FIG. 6.

Figure 2:
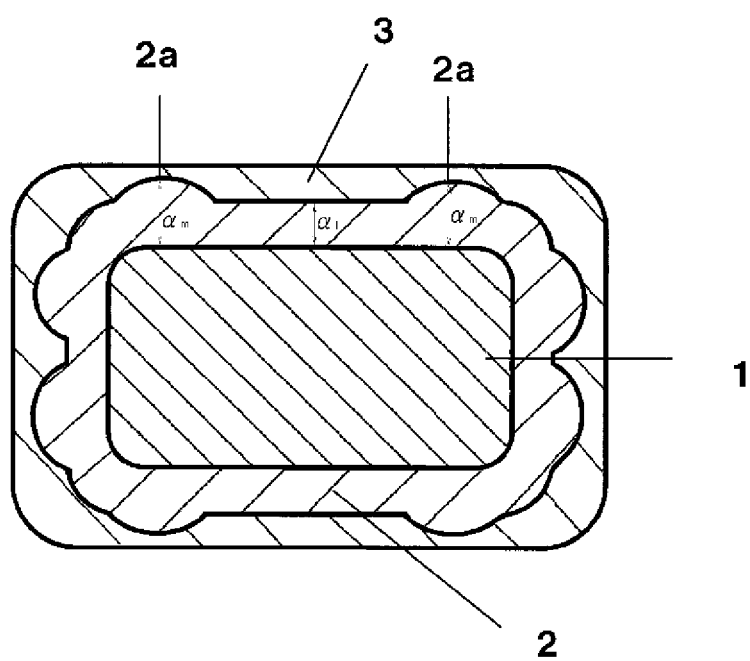
FIG. 2 is a schematic cross-sectional view showing the insulated wire of the present invention, and is a first schematic diagram showing that a thickness of the innermost thermosetting resin layer having contact with the conductor differs depending on the position on the conductor.
Figure 3:
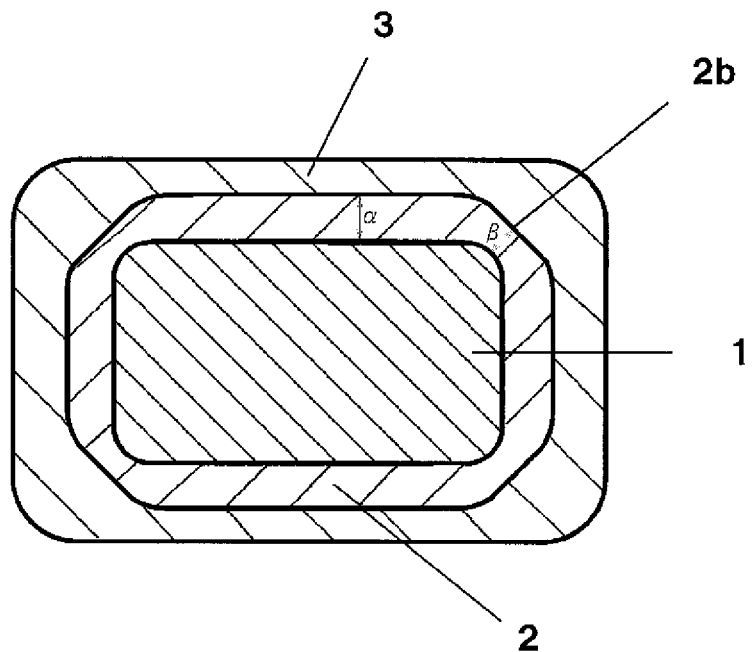
FIG. 3 is a schematic cross-sectional view showing the insulated wire of the present invention, and is a second schematic diagram showing that a thickness of the innermost thermosetting resin layer having contact with the conductor differs depending on the position on the conductor.
Figure 4:
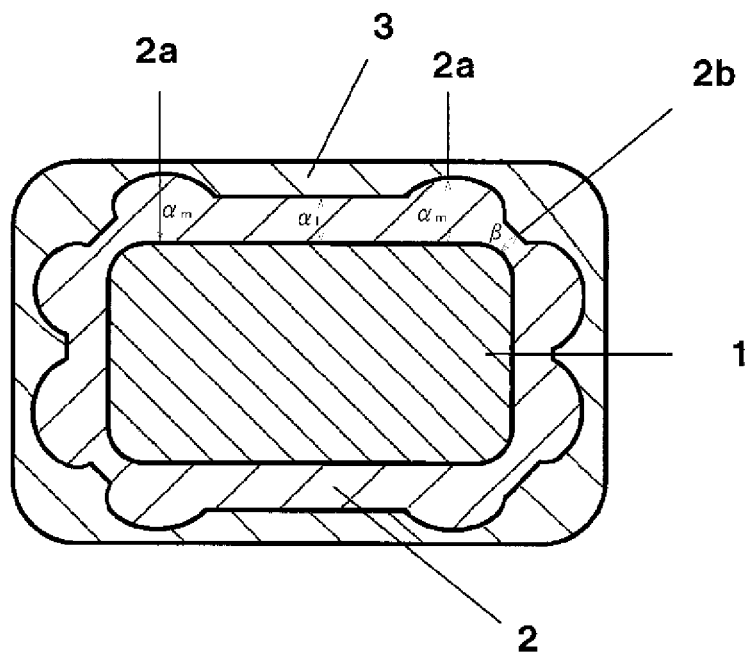
FIG. 4 is a schematic cross-sectional view showing the insulated wire of the present invention, and is a third schematic diagram showing that a thickness of the innermost thermosetting resin layer having contact with the conductor differs depending on the position on the conductor.

In the present invention, insulated wires in which the thickness of the innermost layer having contact with the conductor has been changed are also preferable. FIGS. 2 to 4 show preferable embodiments in which this thickness has been changed. In this case, in the thickness of the innermost layer having contact with the conductor, an average thickness thereof is a range of from more than 5 μm to 10 μm or less. However, it is particularly preferable that the thickness even at any portion is in the range of from more than 5 μm to 10 μm or less.

A preferable change in thickness is the following embodiments.

The first of the embodiments is an embodiment in which a thickness on both ends of at least one side excluding corners of the conductor is thicker than a thickness on a central part of said side.

In this embodiment, in every 2 long sides or 2 short sides (an opposed pair of sides), the thickness on both ends is more preferably thicker than the thickness on a central part. In all of 4 sides, the thickness on both ends is particularly preferably thicker than the thickness on a central part.

The thickness on both ends is preferably as thick as 1.2 to 2.0 times, more preferably as thick as 1.4 to 1.7 times, of the thickness on a central part.

In FIG. 2, the most preferable embodiment is schematically shown. The portion 2a in which the thickness $\alpha_m$ on both ends of the side, excluding corners of the conductor 1, is thicker than the thickness $\alpha_1$ on a central part of said side, is present at 4 sides on the conductor 1.

The second of the embodiments is an embodiment in which the thickness on at least one corner of 4 corners that constitute a rectangle as a cross-sectional shape of the conductor is thinner than an average thickness on a side portion.

In this embodiment, the thickness on each of 2 corners is more preferably thinner than an average thickness on the side portion. The thickness on each of 3 corners is further more preferably thinner than an average thickness on the side portion. The thickness on each of 4 corners is particularly preferably thinner than an average thickness on the side portion.

The thickness on the corner is preferably from 1/2.0 to 1/1.2, more preferably from 1/1.7 to 1/1.4, of an average thickness on the side portion.

In FIG. 3, the most preferable embodiment is schematically shown. This embodiment has a portion 2b whose thickness β on each of 4 corners of the conductor 1 is thinner than an average thickness α on the side portion.

The third of the embodiments is admixture of the first embodiment and the second embodiment.

A combination of each of preferable embodiments of the first embodiment and the second embodiment is a more preferable embodiment. The most preferable embodiment is a combination of each of the most preferable embodiments of the first embodiment and the second embodiment.

In FIG. 4, the most preferable embodiment is schematically shown. The thickness β on each of 4 corners of the conductor 1 is thinner than an average thickness α on the side portion.

Note that, similarly to FIG. 1, FIGS. 2 to 4 also show a remaining portion 3 laminated at the outer periphery of the innermost layer 2 having contact with the conductor 1. However, said portion 3 may be a single layer or a multi-layered laminate. Further, if necessary, a thermoplastic resin layer may be provided on this thermosetting resin layer, which is omitted in FIGS. 2 to 4.

Herein, in the present specification, measurement of the average thickness is conducted by a 16-point measurement. The 16-point measurement is a measurement method that is commonly used in this field. A specific measurement method is described in a pamphlet of International Patent Publication WO No. 2013/073397.

[Thickness of Layer Other than Innermost Layer having Contact with Conductor]

After forming a layer other than the innermost layer having contact with the conductor, a thermosetting resin varnish is repeatedly coated and baked, whereby at least 2 layer or more-laminated thermosetting resin layers are formed.

The thickness of the layer other than the innermost layer having contact with the conductor may be more than 5 μm and 10 μm or less which is the same range as the innermost layer having contact with the conductor. However, a laminated structure composed of thinner layers than the innermost layer having contact with the conductor is preferable.

Figure 5:
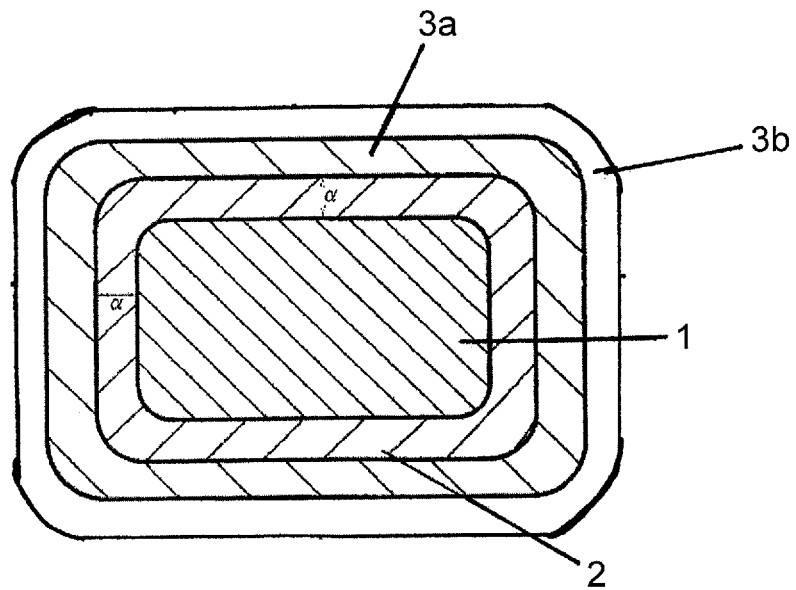
FIG. 5 is a schematic cross-sectional view showing another embodiment of the insulated wire of the present invention.

Among these, in the present invention, preferably in the thermosetting resin layer having a laminated structure covering the conductor at the outer periphery of the innermost layer having contact with the conductor, it is preferable that laminated layers composed of at least 2 layers 3a and 3b each having a thickness of 5 μm or less are provided at the furthest side from the conductor (as shown in FIG. 5).

In the present invention, assuming that a layer of more than 5 μm and 10 μm or less is an A layer, a layer of 5 μm or less (preferably 2 μm or more and 5 μm or less, and more preferably 3 μm or more and 4 μm or less) is a B layer, and a thermoplastic resin layer of 30 μm or more and 130 μm or less is a C layer, these layers are preferably constituted of the A layer containing the innermost layer having contact with the conductor, the B layer, and the C layer (the C layer is not necessary) in this order from the side close to the conductor.

Herein, it is more preferable that the C layer is involved and these layers are constituted in the order of the A layer containing the innermost layer having contact with the conductor, the B layer, and the C layer.

Further, the A layer and the B layer may constitute a laminated structure composed of each of at least one layer. The A layer consists of preferably from 1 to 5 layers, more preferably from 2 to 4 layers, and more preferably from 3 or 4 layers. On the other hand, the B layer consists of preferably from 15 to 30 layers, more preferably from 15 to 25 layers, and more preferably from 20 to 25 layers.

Due to such the constitution, even in a case where a coating thickness of the A layer would become uneven, the unevenness can be offset with the B layer, which makes it possible to uniform the final coating thickness. Further, due to such an offset of the A layer whose coating thickness would become uneven, with the B layer, adhesiveness (interlayer adhesiveness) between the A layer and the B layer can be improved.

Herein, if the lamination number of A layers would get to 6 layers or more, a dog bone-shaped coating becomes likely to be formed and allows easy delamination (peeling off the layers).

[Entire Constitution of Laminated Thermosetting Resin Layers]

In the present invention, the total thickness of the laminated thermosetting resin layers is preferably from 30 to 130 μm, more preferably more than 60 μm and 130 μm or less, still more preferably from 65 to 130 μm, and particularly preferably from 80 to 120 μm.

Further, the number of repetitions of coating and baking for forming the thermosetting resin layers is preferably from 16 to 35 times, and more preferably from 23 to 29 times.

A ratio of an average thickness of the innermost layer having contact with the conductor to the total thickness of the thermosetting resin layers is preferably from 5 to 10%.

By adjusting in this way, a hardness of the resin in the innermost layer having contact with the conductor can be lowered, which makes it possible to improve the adhesive force with the conductor.

The cross-sectional shape of the insulated wire according to the present invention is preferably a similarity shape of the conductor. In particular, it is particularly preferable that a shape of the entire thermosetting resin layers, in other words, the cross-sectional shape of the outermost side opposite to the side of the conductor having thereon the thermosetting resin layers is a similarity shape of the conductor, and the overall thickness of the thermosetting resin layers is uniform.

(Other Layers)

In the present invention, other layers may be provided on the thermosetting resin layers.

As said other layer, a thermoplastic layer is preferable in terms of further improvement in ATF resistance.

In a case of providing said other layers, the overall thickness of said other layers including the thermoplastic layer is preferably thinner than the thermosetting resin layers. Assuming that the total thickness of the thermosetting resin layers would be 100, the overall thickness of said other layers is preferably 95 or less, more preferably 90 or less, still more preferably 80 or less, and most preferably 0.

[Thermoplastic Resin Layer]

Examples of the thermoplastic resin constituting the thermoplastic resin layer include: commodity engineering plastics, such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh molecular weight polyethylene; and, in addition, super engineering plastics, such as polysulfone (PSF), polyether sulfone (PES), polyphenylene sulfide (PPS), polyarylate (U polymer), polyamide imide, polyether ketone (PEK), polyarylether ketone (PAEK), tetrafluoroethylene/ethylene copolymer (ETFE), polyether ether ketone (PEEK) (including a modified polyether ether ketone (modified PEEK)), tetrafluoroethylene/perfluoalkyl vinyl ether copolymer (PFA), polytetrafluoroethylene (PTFE), thermoplastic polyimide resin (TPI), polyamideimide (PAI), and liquid crystal polyester; and further polymer alloy composed of polyethylene terephthalate (PET) or polyethylene naphthalate (PEN) as a base resin, ABS/polycarbonate, NYLON 6,6, aromatic polyamide resin (aromatic PA), polymer alloys containing the foregoing engineering plastics, such as polyphenylene ether/NYLON 6,6, polyphenylene ether/polystyrene, and polybutylene terephthalate/polycarbonate.

Whether the thermoplastic resin is crystalline or non-crystalline does not matter.

Among these thermoplastic resins, polysulfone (PSF), polyether sulfone (PES), polyphenylene sulfide (PPS), polyether ketone (PEK), polyarylether ketone (PAEK), and polyether ether ketone (PEEK) are preferred; and polyphenylene sulfide (PPS) and polyether ether ketone (PEEK) are more preferred.

The thermoplastic resin layer is ordinarily formed by extrusion-forming.

<<Method of Producing Insulated Wire>>

In the present invention, the insulated wire is produced by the following steps:

in a coating and baking step of repeating 2 times or more a step of coating and baking the same or different kind of a thermosetting resin varnish at the outer periphery of the conductor, at a first step of coating and baking the thermosetting resin varnish, a varnish of a thermosetting resin having an imide bond is used to form a layer having an average thickness of more than 5 μm and 10 μm or less, and then a step of coating and baking a varnish of a thermosetting resin that is the same or different from said thermosetting resin having an imide bond is carried out, to thereby form thermosetting resin layers having a laminated structure of 2 or more layers; and, if necessary, a composition containing a thermoplastic resin is further extrusion-formed on the thermosetting resin layers, to thereby form the thermoplastic resin layer.

The thermosetting resin varnish that can be used in the present invention may contain various kinds of additives or the like, such as a bubble-forming foaming agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, to the extent that the characteristics are not affected.

The thermosetting resin varnish contains an organic solvent and the like, so as to make the thermosetting resin be a varnish. The organic solvent is not particularly limited as long as the organic solvent does not inhibit the reaction of the thermosetting resin, and examples thereof include: amide-based solvents, such as N-methyl-2-pyrrolidone (NMP), N,N-dimethylacetamide (DMAC), and N,N-dimethylformamide (DMF); urea-based solvents, such as N,N-dimethylethyleneurea, N,N-dimethylpropyleneurea, and tetramethylurea; lactone-based solvents, such as γ-butyrolactone and γ-caprolactone; carbonate-based solvents, such as propylene carbonate; ketone-based solvents, such as methyl ethyl ketone, methyl isobutyl ketone, and cyclohexanone; ester-based solvents, such as ethyl acetate, n-butyl acetate, butyl cellosolve acetate, butyl carbitol acetate, ethyl cellosolve acetate, and ethyl carbitol acetate; glyme-based solvents, such as diglyme, triglyme, and tetraglyme; hydrocarbon-based solvents, such as toluene, xylene, and cyclohexane; phenol-based solvents, such as cresol, phenol, and halogenated phenol; sulfone-based solvents, such as sulfolane; and dimethylsulfoxide (DMSO).

Of these organic solvents, in view of high solubility, high reaction promotion properties and the like, amide-based solvents, and urea-based solvents are preferred; and in view of a solvent without a hydrogen atom that is apt to inhibit a crosslinking reaction due to heating, N-methyl-2-pyrrolidone (NMP), N,N-dimethylacetamide, N,N-dimethylethyleneurea, N,N-dimethylpropyleneurea, and tetramethylurea are more preferred; and N,N-dimethylacetamide, N-methyl-2-pyrrolidone, N,N-dimethylformamide, and dimethylsulfoxide are particularly preferred.

Regarding the organic solvent and the like, one kind may be used alone, or two or more kinds may be used in mixture.

As a thermosetting resin varnish, commercially-available products may be used as mentioned above. In this case, since the thermosetting resin is dissolved in an organic solvent, the varnish contains the organic solvent.

The method of coating the thermosetting resin varnish on the conductor may be pursued in the usual manner. Examples of the coating method include: a method of employing a die for a varnish coating, which has been manufactured so as to be similar to the shape of the conductor; and a method of employing a die that is called "universal die", which has been formed in a curb shape, when the cross-section shape of the conductor is quadrangular.

In a case of partially changing the thickness of the innermost thermosetting resin layer having contact with the conductor, the thickness is adjusted by using a die having a cross-sectional shape on the opposite side of the conductor of the thermosetting resin layer, that is identical to or has a similarity shape of the intended outer shape.

The conductor having the thermosetting resin varnish coated thereon is baked by a baking furnace in a usual manner. Although specific baking conditions depend on the shape of a furnace to be used, in the case where the furnace is an about 8 m-sized vertical furnace by natural convection, the baking can be achieved by setting the passing time period to 10 to 90 sec at the furnace temperature of 400 to 650° C.

In the present invention, the coating and baking is repeated with a varnish of the thermosetting resin which is the same or different from the innermost thermosetting resin having contact with the conductor.

Herein, a change of thickness and a change of baking conditions in this repetition do not matter.

In a case of providing the thermoplastic resin layer on the thermosetting resin layers, for example, using the conductor having the thermosetting resin layers formed thereon (also called as an enamel wire) as the core wire, by extrusion-covering a composition containing the thermoplastic resin on the enamel wire using a screw of the extruder, to form the thermoplastic resin layer, to thereby make it possible to obtain the insulated wire. On this occasion, the extrusion-covering of the thermoplastic resin layer is carried out, using an extrusion die at a temperature (i.e. the grass transition temperature or higher, when the non-crystalline resin is used) of the melting point or higher of the thermoplastic resin, so that the cross-sectional outer shape of the extrusion-covering resin layer has a similarity shape of the conductor and takes the shape, by which a predetermined thickness of each of the side portion and the corner is obtained. The thermoplastic resin layer can be also formed by using a thermoplastic resin together with an organic solvent and the like.

The composition containing the thermoplastic resin may contain, in addition to the thermoplastic resin, various kinds of additives or the like, such as a bubble-forming nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer, to the extent that the characteristics are not affected.

In a case of using a non-crystalline thermoplastic resin, aside from the extrusion-forming, the thermoplastic resin layer can be also formed by coating and baking a varnish of the non-crystalline thermoplastic resin having been dissolved in an organic solvent or the like on an enamel wire, using a die whose shape has the similarity in the shape of the conductor.

As the organic solvent for the thermoplastic resin varnish, the organic solvents cited in the thermosetting resin varnish are preferable.

Further, specific baking conditions depend on a shape of the furnace to be used. However, such conditions as described about the thermosetting resin are preferable.

<Characteristics of Insulated Wire>

The insulated wire of the present invention is excellent in terms of adhesiveness (conductor adhesiveness and interlayer adhesiveness) and ATF resistance, in addition to electric characteristics. Further, the insulated wire is also excellent in heat resistance.

Regarding the electric characteristics which the insulated wire is expected to have, the partial discharge inception voltage is preferably 700 Vp or more, more preferably 800 Vp or more, and still more preferably 1,000 Vp or more. The upper limit of the partial discharge inception voltage is not limited in particular. For example, it is preferably 2,500 Vp or less.

Further, the insulated wire of the present invention has adhesiveness of the degree in which delamination (peeling from) between the conductor and the thermosetting resin layers cannot be confirmed, in the bending workability test described below, using a previously scratched insulated wire.

Further, the insulated wire of the present invention achieves the number of twist of 30 or more until delamination is caused between thermosetting resin layers, by a "delamination test" prescribed in section 5.4 of JIS-C3216-3 as described below, and is excellent in interlayer adhesiveness and also in workability.

The insulated wire of the present invention is also excellent in ATF resistance. For example, in the ATF resistance test described below, a crack of the resin coating of the insulated wire does not spread to the conductor. Further, preferably, a crack of the resin coating of the insulated wire is not caused.

Further, the insulated wire of the present invention has an excellent heat resistance. For example, in the heat resistance test, it is confirmed that, using each of the insulated wires produced in Examples described below, even if these are exposed for 1,000 hours in the environment of 220° C. under the condition of the 1%-extended straight-insulated wire, a crack is not caused on a surface of the resin coating in any one of the insulated wires.

<<Coil, Rotating Electrical Machine, and Electrical or Electronic Equipment>>

The insulated wire of the present invention is applicable to a field which requires the electrical property (e.g. the resistance to voltage) and the heat resistance, such as a rotating electrical machine and various kinds of electrical or electronic equipment, as a coil. For example, the insulated wire of the present invention is used for a motor, a transformer and the like, which can compose high-performance rotating electrical machine and electrical or electronic equipment. In particular, the insulated wire is preferably used as a winding wire for a driving motor of hybrid vehicles (HV) and electrical vehicles (EV).

EXAMPLES

The present invention will be described in more detail based on examples given below, but the invention is not meant to be limited by these.

In Example 1 and Comparative Examples 1 to 5, the insulated wires composed of the thermosetting resin layers each having a cross-sectional shape shown in FIG. 1 were produced. In Examples 2 and 3, the insulated wires composed of the thermosetting resin layers each having a cross-sectional shape shown in FIG. 2 were produced. In Example 4, the insulated wire composed of the thermosetting resin layers each having a cross-sectional shape shown in FIG. 3 was produced. In Examples 5 and 6, the insulated wires composed of the thermosetting resin layers each having a cross-sectional shape shown in FIG. 4 were produced.

Note that, in FIGS. 1 to 4, in a case where the insulated wire to be produced has the thermoplastic resin layer on the thermosetting resin layers, said thermoplastic resin layer is omitted therefrom.

To each of the produced insulated wires, evaluation was conducted in terms of the following characteristics, and their results are shown in Table 1.

Example 1

As a conductor 1, use was made of: a rectangular conductor having a rectangular cross-section (long side 3.2 mm×short side 2.4 mm, curvature radius of chamfered edges at four corners r=0.3 mm) (copper having an oxygen content of 15 ppm).

A polyimide (PI) varnish (trade name: U-IMIDE, manufactured by Unitika) was coated on a surface of the conductor 1, with using a die having a cross-sectional outer shape of the innermost thermosetting resin layer having contact with the conductor, and having a similarity shape of the cross-sectional shape shown in FIG. 1, followed by passing through a 8 m-long baking furnace controlled at 450° C. at the speed of 15 seconds passing time. In this once baking step, a layer having a thickness of 8 μm (a layer 1 having contact with the conductor) was formed. This step was further repeated 2 times, to thereby form the thermosetting resin layers (A layers) composed of PI that had an inner layer composed of 3 layers having the total thickness of 24 μm.

Then, the PI varnish was coated on a surface of the thermosetting resin layers (A layers), with using a die whose outer cross-sectional shape had a similarity shape of the conductor 1, followed by passing through a 8 m-long baking furnace controlled at 450° C. at the speed of 15 seconds passing time. This coating and baking was repeated 22 times, to thereby form thermosetting resin layers (B layers having a thickness of 71 μm) composed of 22 laminated layers, each of which had a thickness of 3.1 to 3.3 μm. The total thickness of the thermosetting resin layers [the total of the thermosetting resin layers (A layers) and the thermosetting resin layers (B layers)] covering an outer periphery of the conductor was 95 μm.

Example 2

As a conductor 1, the conductor 1 to be used in Example 1 was used.

The PI varnish to be used in Example 1 was coated on a surface of the conductor 1, with using a die having a cross-sectional shape of the innermost thermosetting resin layer having contact with the conductor 1, and having a similarity shape of the outer cross-sectional shape shown in FIG. 2, followed by passing through a 8 m-long baking furnace controlled at 450° C. at the speed of 15 seconds passing time. In this once baking step, a layer having an average thickness of 8 μm (a layer 1 having contact with the conductor: the thickness of each of the both ends, the sides, and the corners is referred to the corresponding thickness shown in Table 1) was formed. This step was further repeated 3 times, to thereby form the thermosetting resin layers (A layers) composed of PI that had an inner layer composed of 4 layers having an average thickness of 36 μm in total.

Then, the PI varnish was coated on a surface of the thermosetting resin layers (A layers), with using a die whose outer cross-sectional shape had a similarity shape of the conductor 1, followed by passing through a 8 m-long baking furnace controlled at 450° C. at the speed of 15 seconds passing time. This coating and baking was repeated 19 times, to thereby form thermosetting resin layers (B layers having a thickness of 74 μm) composed of 19 laminated layers, each of which had a thickness of 3.8 to 3.9 μm. The total thickness of the thermosetting resin layers [the total of the thermosetting resin layers (A layers) and the thermosetting resin layers (B layers)] covering an outer periphery of the conductor was 110 μm.

Example 3

As a conductor 1, the conductor 1 to be used in Example 1 was used.

A polyetherimide (PEI) varnish (trade name: ULTEM1010, manufactured by SABIC Innovative Plastics, glass transition temperature 217° C.) was prepared, by dissolving the PEI in N-methyl-2-pirrolidon (NMP). This PEI varnish was coated on a surface of the conductor 1, with using a die having a cross-sectional shape of the innermost thermosetting resin layer having contact with the conductor 1, and having a similarity shape of the outer cross-sectional shape shown in FIG. 2, followed by passing through a 8 m-long baking furnace controlled at 450° C. at the speed of 15 seconds passing time. In this once baking step, a layer having an average thickness of 9 μm (a layer 1 having contact with the conductor: the thickness of each of the both ends, the sides, and the corners is referred to the corresponding thickness shown in Table 1) was formed. This step was further repeated 1 time, to thereby form the thermosetting resin layers (A layers) composed of PEI that had an inner layer composed of 2 layers having an average thickness of 18 μm in total.

Then, the PI varnish was coated on a surface of the thermosetting resin layers (A layers), with using a die whose outer cross-sectional shape had a similarity shape of the conductor 1, followed by passing through a 8 m-long baking furnace controlled at 450° C. at the speed of 15 seconds passing time. This coating and baking was repeated 24 times, to thereby form thermosetting resin layers (B layers having a thickness of 72 μm) composed of 24 laminated layers, each of which had a thickness of 3.0 μm. The total thickness of the thermosetting resin layers [the total of the thermosetting resin layers (A layers) and the thermosetting resin layers (B layers)] covering an outer periphery of the conductor was 90 μm.

A conductor wire covered with the thermosetting resin layers (enamel layers) obtained as described above was used as a core wire, and a thermoplastic resin layer was formed on the outer periphery of the thermosetting resin layers, as described below, with using an extruder equipped with a 30 mm-full flight screw (screw L/D=25, screw compression ratio=3), as a screw.

As the thermoplastic resin, polyetheretherketone (PEEK) (trade name: KetaSpire KT-820, dielectric constant 3.1, manufactured by Solvay Specialty Polymers) was used, and an extrusion-covering of PEEK was carried out, with using an extrusion die in a manner such that an outer cross-sectional shape of the thermoplastic resin layer had a similarity shape of the conductor shape. Thus, the 60 μm-thick thermoplastic resin layer was formed at the outside of the thermosetting resin layers.

Example 4

As a conductor 1, the conductor 1 to be used in Example 1 was used.

A polyamideimide (PAI) varnish (trade name: HI406, manufactured by Hitachi Chemical) was coated on a surface of the conductor 1, with using a die having a cross-sectional shape of the innermost thermosetting resin layer having contact with the conductor 1, and having a similarity shape of the outer cross-sectional shape shown in FIG. 3, followed by passing through a 8 m-long baking furnace controlled at 450° C. at the speed of 15 seconds passing time. In this once baking step, a layer having an average thickness of 7 μm (a layer 1 having contact with the conductor: the thickness of each of the both ends, the sides, and the corners is referred to the corresponding thickness shown in Table 1) was formed. This step was further repeated 3 times, to thereby form the thermosetting resin layers (A layers) composed of PAI that had an inner layer composed of 4 layers having an average thickness of 28 μm in total.

Then, the PAI varnish was coated on a surface of the thermosetting resin layers (A layers), with using a die whose outer cross-sectional shape had a similarity shape of the conductor 1, followed by passing through a 8 m-long baking furnace controlled at 450° C. at the speed of 15 seconds passing time. This coating and baking was repeated 21 times, to thereby form thermosetting resin layers (B layers having a thickness of 82 μm) composed of 21 laminated layers, each of which had a thickness of 3.9 μm±0.01 μm. The total thickness of the thermosetting resin layers [the total of the thermosetting resin layers (A layers) and the thermosetting resin layers (B layers)] covering an outer periphery of the conductor was 110 μm.

Example 5

As a conductor 1, the conductor 1 to be used in Example 1 was used.

The polyimide (PI) varnish to be used in Example 1 was coated on a surface of the conductor 1, with using a die having a cross-sectional shape of the innermost thermosetting resin layer having contact with the conductor 1, and having a similarity shape of the outer cross-sectional shape shown in FIG. 4, followed by passing through a 8 m-long baking furnace controlled at 450° C. at the speed of 15 seconds passing time. In this once baking step, a layer having an average thickness of 8 μm (a layer 1 having contact with the conductor: the thickness of each of the both ends, the sides, and the corners is referred to the corresponding thickness shown in Table 1) was formed. This step was further repeated 2 times, to thereby form the thermosetting resin layers (A layers) composed of PAI that had an inner layer composed of 3 layers having an average thickness of 21 μm in total.

Then, the PAI varnish to be used in Example 4 was coated on a surface of the thermosetting resin layers (A layers), with using a die whose outer cross-sectional shape had a similarity shape of the conductor 1, followed by passing through a 8 m-long baking furnace controlled at 450° C. at the speed of 15 seconds passing time. This coating and baking was repeated 20 times, to thereby form thermosetting resin layers (B layers having a thickness of 74 μm) composed of 20 laminated layers, each of which had a thickness of 3.0 to 3.1 μm. The total thickness of the thermosetting resin layers [the total of the thermosetting resin layers (A layers) and the thermosetting resin layers (B layers)] covering an outer periphery of the conductor was 95 μm.

Example 6

As a conductor 1, the conductor 1 to be used in Example 1 was used.

A polyesterimide (PEsI) varnish (trade name: Neoheat8600A, manufactured by Toutoku Toryo) was coated on a surface of the conductor 1, with using a die having a cross-sectional shape of the innermost thermosetting resin layer having contact with the conductor 1, and having a similarity shape of the outer cross-sectional shape shown in FIG. 4, followed by passing through a 8 m-long baking furnace controlled at 450° C. at the speed of 15 seconds passing time. In this once baking step, a layer having an average thickness of 7 μm (a layer 1 having contact with the conductor: the thickness of each of the both ends, the sides, and the corners is referred to the corresponding thickness shown in Table 1) was formed. This step was further repeated 1 time, to thereby form the thermosetting resin layers (A layers) composed of PEsI that had an inner layer composed of 2 layers having an average thickness of 14 μm in total.

Then, the PEsI varnish was coated on a surface of the thermosetting resin layers (A layers), with using a die whose outer cross-sectional shape had a similarity shape of the conductor 1, followed by passing through a 8 m-long baking furnace controlled at 450° C. at the speed of 15 seconds passing time. This coating and baking was repeated 25 times, to thereby form thermosetting resin layers (B layers having a thickness of 76 μm) composed of 25 laminated layers, each of which had a thickness of 3.0 to 3.1 μm. The total thickness of the thermosetting resin layers [the total of the thermosetting resin layers (A layers) and the thermosetting resin layers (B layers)] covering an outer periphery of the conductor was 90 μm.

Comparative Example 1

As a conductor 1, the conductor 1 to be used in Example 1 was used.

The polyimide (PI) varnish to be used in Example 1 was coated on a surface of the conductor 1, with using a die having a cross-sectional shape of the innermost thermosetting resin layer having contact with the conductor 1, and having a similarity shape of the outer cross-sectional shape shown in FIG. 1, followed by passing through a 8 m-long baking furnace controlled at 450° C. at the speed of 15 seconds passing time. In this once-baking step, a 2 μm-thick layer (the layer 1 having contact with the conductor) was formed. Thus, a single layer of the thermosetting resin layer (A layer) composed of PI was formed.

Then, the PI varnish was coated on a surface of the thermosetting resin layer (A layer), with using a die whose outer cross-sectional shape had a similarity shape of the conductor 1, followed by passing through a 8 m-long baking furnace controlled at 450° C. at the speed of 15 seconds passing time. This coating and baking was repeated 29 times, to thereby form thermosetting resin layers (B layers having a thickness of 95 μm) composed of 29 laminated layers, each of which had a thickness of 3.2 to 3.3 μm. The total thickness of the thermosetting resin layers [the total of the thermosetting resin layer (A layer) and the thermosetting resin layers (B layers)] covering an outer periphery of the conductor was 97 μm.

Comparative Example 2

As a conductor 1, the conductor 1 to be used in Example 1 was used.

The polyamideimide (PAI) varnish to be used in Example 4 was coated on a surface of the conductor 1, with using a die having a cross-sectional shape of the innermost thermosetting resin layer having contact with the conductor 1, and having a similarity shape of the outer cross-sectional shape shown in FIG. 1, followed by passing through a 8 m-long baking furnace controlled at 450° C. at the speed of 15 seconds passing time. In this once baking step, a layer having a thickness of 2 μm (a layer 1 having contact with the conductor) was formed, to thereby form a single layer of the thermosetting resin layer (A layer) composed of PAI.

Then, the PAI varnish was coated on a surface of the thermosetting resin layer (A layer), with using a die whose outer cross-sectional shape had a similarity shape of the conductor 1, followed by passing through a 8 m-long baking furnace controlled at 450° C. at the speed of 15 seconds passing time. This coating and baking was repeated 36 times, to thereby form thermosetting resin layers (B layers having a thickness of 110 μm) composed of 36 laminated layers, each of which had a thickness of 3.0 μm. The total thickness of the thermosetting resin layers [the total of the thermosetting resin layer (A layer) and the thermosetting resin layers (B layers)] covering an outer periphery of the conductor was 112 μm.

Comparative Example 3

As a conductor 1, the conductor 1 to be used in Example 1 was used.

A polyurethane (PU) varnish (trade name: TSF242, manufactured by Toutoku Toryo) was coated on a surface of the conductor 1, with using a die having a cross-sectional shape of the innermost thermosetting resin layer having contact with the conductor 1, and having a similarity shape of the outer cross-sectional shape shown in FIG. 1, followed by passing through a 8 m-long baking furnace controlled at 450° C. at the speed of 15 seconds passing time. In this once baking step, a layer having a thickness of 2 μm (a layer 1 having contact with the conductor) was formed, to thereby form a single layer of the thermosetting resin layer (A layer) composed of PU.

Then, the polyamideimide (PAI) varnish to be used in Example 4 was coated on a surface of the thermosetting resin layer (A layer), with using a die whose outer cross-sectional shape had a similarity shape of the conductor 1, followed by passing through a 8 m-long baking furnace controlled at 450° C. at the speed of 15 seconds passing time. This coating and baking was repeated 30 times, to thereby form thermosetting resin layers (B layers having a thickness of 90 μm) composed of 30 laminated layers, each of which had a thickness of 3.0 μm. The total thickness of the thermosetting resin layers [the total of the thermosetting resin layer (A layer) and the thermosetting resin layers (B layers)] covering an outer periphery of the conductor was 92 μm.

Comparative Example 4

As a conductor 1, the conductor 1 to be used in Example 1 was used.

The PI varnish to be used in Example 1 was coated on a surface of the conductor 1, with using a die having a cross-sectional shape of the innermost thermosetting resin layer having contact with the conductor 1, and having a similarity shape of the outer cross-sectional shape shown in FIG. 1, followed by passing through a 8 m-long baking furnace controlled at 450° C. at the speed of 15 seconds passing time. In this once-baking step, a 5 μm-thick layer (the layer 1 having contact with the conductor) was formed. Thus, a single layer of the thermosetting resin layer (A layer) composed of PI was formed.

Then, the PI varnish was coated on a surface of the thermosetting resin layer (A layer), with using a die whose outer cross-sectional shape had a similarity shape of the conductor 1, followed by passing through a 8 m-long baking furnace controlled at 450° C. at the speed of 15 seconds passing time. This coating and baking was repeated 40 times, to thereby form thermosetting resin layers (B layers having a thickness of 129 μm) composed of 40 laminated layers, each of which had a thickness of 3.2 to 3.3 μm. The total thickness of the thermosetting resin layers [the total of the thermosetting resin layer (A layer) and the thermosetting resin layers (B layers)] covering an outer periphery of the conductor was 134 μm.

Comparative Example 5

As a conductor 1, the conductor 1 to be used in Example 1 was used.

The PAI varnish to be used in Example 4 was coated on a surface of the conductor 1, with using a die having a cross-sectional shape of the innermost thermosetting resin layer having contact with the conductor 1, and having a similarity shape of the outer cross-sectional shape shown in FIG. 1, followed by passing through a 8 m-long baking furnace controlled at 450° C. at the speed of 15 seconds passing time. In this once-baking step, a 5 μm-thick layer (the layer 1 having contact with the conductor) was formed. Thus, a single layer of the thermosetting resin layer (A layer) composed of PAI was formed.

Then, the PAI varnish was coated on a surface of the thermosetting resin layer (A layer), with using a die whose outer cross-sectional shape had a similarity shape of the conductor 1, followed by passing through a 8 m-long baking furnace controlled at 450° C. at the speed of 15 seconds passing time. This coating and baking was repeated 8 times, to thereby form thermosetting resin layers (B layers having a thickness of 40 μm) composed of 8 laminated layers, each of which had a thickness of 5.0 μm. The total thickness of the thermosetting resin layers [the total of the thermosetting resin layer (A layer) and the thermosetting resin layers (B layers)] covering an outer periphery of the conductor was 45 μm.

A conductor wire covered with the thermosetting resin layers (enamel layers) obtained as described above was used as a core wire, and a thermoplastic resin layer was formed on the outer periphery of the thermosetting resin layers, as described below, with using an extruder equipped with a 30 mm-full flight screw (screw L/D=25, screw compression ratio=3), as a screw.

As the thermoplastic resin, the PEEK to be used in Example 3 was used, and an extrusion-covering of PEEK was carried out, with using an extrusion die in a manner such that an outer cross-sectional shape of the thermoplastic resin layer had a similarity shape of the conductor shape. Thus, the 103 μm-thick thermoplastic resin layer was formed at the outside of the thermosetting resin layers.

To each of the insulated wires produced in the above-described way, evaluation was conducted as described below in terms of conductor adhesiveness (adhesiveness between the conductor and the thermosetting resin layers), interlayer adhesiveness (adhesiveness between the thermosetting resin layers), and ATF resistance.

[Conductor Adhesiveness Test]

Adhesiveness between the conductor and the thermosetting resin layers in the insulated wire was evaluated by the following bending workability test.

A 300 mm-long straight specimen was cut-off from each of the produced insulated wires. Note that, in a case of the insulated wire in which the thermoplastic resin layer was provided on the thermosetting resin layers, a specimen in which the thermoplastic resin layer was not yet provided was used. A scratch (incision) of about 5 μm in depth and 2 μm in length was put on a central part of the thermosetting resin layers at the edge surface of this straight specimen, with using a dedicated jig, respectively, in both the longitudinal direction and the vertical direction (in this instance, the thermosetting resin layers and the conductor adhered to each other and were not delaminated therefrom). Herein, the edge surface means a surface which a short side (in FIGS. 1 to 4, a short side in the rectangle-shape of the outermost surface of the cross-sectional shape of the insulated wire), in the cross-sectional shape of the rectangle-shaped insulated wire, forms in a row successively in the axis direction. Accordingly, the scratch is provided at either one of right- or left-side in the drawing of the insulated wire shown in FIGS. 1 to 4.

The straight specimen with this scratch at the top was bent centering on the iron core having a diameter of 1.0 mm at 180° (in a U-shape), and this state was continued for 5 minutes. Progression of delamination between the conductor and the thermosetting resin layers occurred near the top of the straight specimen was observed with the naked eye.

This test was repeated 5 times, and evaluation was conducted in accordance with the following criteria.

Evaluation Criterion

A: In five times out of five times, any scratch did not spread, and the thermosetting resin layers were not delaminated from the conductor.

B: In once out of five times, at least one scratch formed on the thermosetting resin layers did spread, and the thermosetting resin layers were delaminated from the conductor.

C: In two times out of five times, at least one scratch formed on the thermosetting resin layers did spread, and the thermosetting resin layers were delaminated from the conductor.

D: In three times or more out of five times, at least one scratch formed on the thermosetting resin layers did spread, and the thermosetting resin layers were delaminated from the conductor.

[Interlayer Adhesiveness Test]

A twist test was carried out to evaluate workability, especially an adhesiveness of the coating when a shear stress was applied between the thermosetting resin layers. With reference to "Delamination Test" prescribed in Section 5.4 of JIS-C3216-3, the number of twists until occurrence of delamination between the thermosetting resin layers was measured, and an average value of five tests was computed. Note that, in a case of the insulated wire in which a thermoplastic resin layer was provided on the thermosetting resin layers, a specimen in which the thermoplastic resin layer was not yet provided was used.

At first, each insulated wire was cut into 50 cm-length pieces. Next, one end of the insulated wire was fixed in this state, and the other end was twisted by the constant load (load magnitude: 100 N) in a given direction, and the number of twists until ascertainment of coating delamination between the thermosetting resin layers was measured. These measuring results were evaluated in accordance with the following criterion.

Evaluation Criterion

A: The number of twists is 30 or more
B: The number of twists is 10 or more and less than 30
C: The number of twists is less than 10

[ATF Resistance Test]

A 300 mm-long straight test specimen was cut out of each of the produced insulated wires, which was placed in a closed SUS vessel. In the vessel, 1300 g of automatic transmission oil (ATE oil: automatic transmission fluid) and 6.5 ml (equivalent to 0.5% by mass) of water were placed, and were heated together with the closed SUS vessel at 150° C. for 500 hours. After heat treatment, the insulated wire was pulled out, and was left to stand until 25° C. (ordinary temperature). After reaching at 25° C., the insulated wire was bent centering on the iron core having a diameter of 1.0 mm at 180°, and presence or absence of the scratch of the resin coating of the insulated wire was observed with the naked eye. Evaluation was conducted in accordance with the following criterion.

Evaluation Criterion

A: No scratch of the resin coating (in a case where the resin coating has a thermosetting resin layer or a thermoplastic resin layer, the resin coating contains the same) of the insulated wire was observed.

B: A slight scratch of the resin coating (in a case where the resin coating has a thermosetting resin layer or a thermoplastic resin layer, the resin coating contains the same) of the insulated wire was observed, but the scratch did not reach the conductor.

C: A scratch of the resin coating (in a case where the resin coating has a thermosetting resin layer or a thermoplastic resin layer, the resin coating contains the same) of the insulated wire, which reached the conductor, was observed.

[Overall Evaluation]

The insulated wire which was ranked as B or higher in terms of every evaluation item as described above was judged as being "acceptable". In contrast, the insulated wire which was ranked as C or lower in terms of at least any one of the evaluation items was judged as being "unacceptable".

The obtained results are shown together in Table 1.

Herein, in the thermoplastic resin layer (C layer), the expression "–" indicates absence of said layer.

TABLE 1

| | | | Ex 1 | Ex 2 | Ex 3 | Ex 4 | Ex 5 | Ex 6 |
|---|---|---|---|---|---|---|---|---|
| Thermosetting resin layers | Overall | Thickness (μm) | 95 | 110 | 90 | 110 | 95 | 90 |
| | The layer having contact with the conductor | Resin | PI | PAI | PEI | PAI | PI | PEsI |
| | | Cross-sectional shape | FIG. 1 | FIG. 2 | FIG. 2 | FIG. 3 | FIG. 4 | FIG. 4 |
| | | Average thickness (μm) | 8 | 8 | 9 | 7 | 8 | 7 |
| | | Thickness of both ends (μm) | 8 | 9 | 10 | 9 | 10 | 9 |
| | | Thickness of the center of sides (μm) | 8 | 6 | 7 | 9 | 8 | 6 |
| | | Thickness of the corners (μm) | 8 | 8 | 9 | 6 | 6 | 5 |
| | The layer having contact with the conductor/overall | Ratio (%) | 8.4 | 7.3 | 10.0 | 6.4 | 8.4 | 7.8 |
| | A layers (containing the layer having contact with the conductor) | The number of layers | 3 | 4 | 2 | 4 | 3 | 2 |
| | | The total average thickness (μm) | 24 | 36 | 18 | 28 | 21 | 14 |
| | B layers (The number of layers on the A layers) | Resin | PI | PI | PI | PAI | PAI | PEsI |
| | | The number of layers | 22 | 19 | 24 | 21 | 20 | 25 |
| | | Total thickness (μm) | 71 | 74 | 72 | 82 | 74 | 76 |
| | | The number of total layers | 25 | 23 | 26 | 25 | 23 | 27 |
| Thermoplastic resin layer (C layer) | | Resin | — | — | PEEK | — | — | — |
| | | Thickness (μm) | | | 60 | | | |
| The total thickness of coating layers of the wire (μm) | | | 95 | 110 | 150 | 110 | 95 | 90 |
| Kind of the conductor | | | Copper | Copper | Copper | Copper | Copper | Copper |
| Results in evaluation | Conductor adhesiveness | | A | A | A | A | A | A |
| | Interlayer adhesiveness | | B | B | A | B | A | A |
| | ATF resistance | | B | B | A | B | B | B |
| | Overall evaluation | | Acceptable | Acceptable | Acceptable | Acceptable | Acceptable | Acceptable |

Remarks: 'Ex' means Example according to this invention.

| | | | CEx 1 | CEx 2 | CEx 3 | CEx 4 | CEx 5 |
|---|---|---|---|---|---|---|---|
| Thermosetting resin layers | Overall | Thickness (μm) | 97 | 112 | 92 | 134 | 45 |
| | The layer having contact with the | Resin | PI | PAI | PU | PI | PAI |
| | | Cross-sectional shape | FIG. 1 | FIG. 1 | FIG. 1 | FIG. 1 | FIG. 1 |

TABLE 1-continued

| | | | | | | |
|---|---|---|---|---|---|---|
| | conductor | Average thickness (μm) | 2 | 2 | 2 | 5 | 5 |
| | | Thickness of both ends (μm) | 2 | 2 | 2 | 5 | 5 |
| | | Thickness of the center of sides (μm) | 2 | 2 | 2 | 5 | 5 |
| | | Thickness of the corners (μm) | 2 | 2 | 2 | 5 | 5 |
| | The layer having contact with the conductor/overall | Ratio (%) | 2.1 | 1.8 | 2.2 | 3.7 | 11.1 |
| | A layers (containing the layer having contact with the conductor) | The number of layers | 1 | 1 | 1 | 1 | 1 |
| | | The total average thickness (μm) | 2 | 2 | 2 | 5 | 5 |
| | B layers (The number of layers on the A layers) | Resin | PI | PAI | PAI | PI | PAI |
| | | The number of layers | 29 | 36 | 30 | 40 | 8 |
| | | Total thickness (μm) | 95 | 110 | 90 | 129 | 40 |
| | The number of total layers | | 30 | 37 | 31 | 41 | 9 |
| Thermoplastic resin layer (C layer) | | Resin | — | — | — | — | PEEK |
| | | Thickness (μm) | | | | | 103 |
| The total thickness of coating layers of the wire (μm) | | | 95 | 110 | 90 | 134 | 143 |
| Kind of the conductor | | | Copper | Copper | Copper | Copper | Copper |
| Results in evaluation | Conductor adhesiveness | | D | D | D | D | C |
| | Interlayer adhesiveness | | B | B | B | B | B |
| | ATF resistance | | B | B | B | B | A |
| | Overall evaluation | | Unacceptable | Unacceptable | Unacceptable | Unacceptable | Unacceptable |

Remarks: 'CEx' means Comparative Example.

From Examples and Comparative Examples, the following can be seen.

By adjusting the thickness of the thermosetting resin layer having contact with the conductor (the innermost layer) to the range of more than 5 μm and 10 μm or less, and adopting a resin having an imide bond as a resin of said layer, both of the conductor adhesiveness and the interlayer adhesiveness which were difficult to achieve by the conventional art can be satisfied. Further, it is seen that the forgoing constitution also achieves excellent ATF resistance.

Having described our invention as related to the present embodiments, it is our intention that the invention not be limited by any of the details of the description, unless otherwise specified, but rather be construed broadly within its spirit and scope as set out in the accompanying claims.

This application claims priority on Patent Application No. 2015-212290 filed in Japan on Oc. 28, 2015, which is entirely herein incorporated by reference.

REFERENCE SIGNS LIST

1 Conductor
2 Innermost layer of the thermosetting resin layers having contact with the conductor
2a Portion whose thickness on the both ends of the sides of the conductor is thick (both ends of the innermost layer of the thermosetting resin layers having contact with the conductor)
2b Portion whose thickness on the corners of the conductor is thin (the corners of the innermost layer of the thermosetting resin layers having contact with the conductor)
3 Layer (also including a multilayer-laminated structure) other than the innermost layer of the thermosetting resin layers having contact with the conductor
$\alpha$ Average thickness of the innermost layer of the thermosetting resin layers having contact with the conductor
$\alpha_m$ Thickness of the portion in which the thickness on the both ends of the sides of the conductor is thick
$\alpha_l$ Thickness on the central portion of the sides of the conductor
$\beta$ Thickness of the portion in which the thickness of the thermosetting resin layers on the corners of the conductor is thin

The invention claimed is:

1. An insulated wire having at least one layer of coating of the wire, comprising a thermosetting resin layer, at the outer periphery of a conductor,
wherein the thermosetting resin layer is comprised of thermosetting resin layers having a laminated structure formed by coating and baking a thermosetting resin varnish; and wherein, in said laminated structure, an innermost layer having contact with the conductor comprises a thermosetting resin having an imide bond and is a layer having an average thickness of more than 5 μm and 9 μm or less;
wherein the thermosetting resin having an imide bond comprises a polyimide, a polyetherimide, or combinations thereof; and
wherein the conductor is a rectangular conductor whose cross-sectional shape perpendicular to the longitudinal direction thereof is rectangular; and wherein, in the thickness of the innermost layer having contact with the conductor and locating on 4 sides that constitute a rectangle as the cross-sectional shape of said conductor, a thickness on both ends of at least one side excluding corners of the conductor is 1.2 to 2.0 times a thickness on a central part of said side.

2. The insulated wire according to claim 1, wherein a ratio of an average thickness of the innermost layer having contact with the conductor to a total thickness of the thermosetting resin layers is from 5 to 10%.

3. The insulated wire according to claim 1, wherein the conductor is a rectangular conductor whose cross-sectional shape perpendicular to the longitudinal direction thereof is rectangular; and wherein a thickness of the innermost layer having contact with the conductor and locating on at least one corner portion of 4 corners that constitute a rectangle as the cross-sectional shape of said conductor is thinner than an average thickness on a side portion of the conductor.

4. The insulated wire according to claim 1, wherein the laminated structure of the thermosetting resin layers has laminated layers composed of at least 2 layers each having a thickness of 5 μm or less at the outer periphery of the innermost layer having contact with the conductor.

5. The insulated wire according to claim 1, wherein a total thickness of the thermosetting resin layers is from 30 to 130 μm.

6. The insulated wire according to claim 1, further comprising at least one thermoplastic resin layer having a thickness of 30 to 130 μm on the thermosetting resin layers.

7. A coil, comprising one or more of the insulated wire according to claim 1.

8. A rotating electrical machine, comprising the coil according to claim 7.

9. An electrical or electronic equipment, having the coil according to claim 7.

10. A method of producing an insulated wire having at least one layer of coating of the wire, comprising a thermosetting resin layer at the outer periphery of a conductor,
comprising a coating and baking step of repeating 2 times or more a step of coating and baking the same or different kind of a thermosetting resin varnish at the outer periphery of the conductor,
wherein at a first step of coating and baking the thermosetting resin varnish, a varnish of a thermosetting resin having an imide bond is used to form a layer having an average thickness of more than 5 μm and 9 μm or less, and then a step of coating and baking a varnish of a thermosetting resin that is the same or different from said thermosetting resin having an imide bond is carried out, to thereby form a thermosetting resin layer having a laminated structure of 2 or more layers;
wherein the thermosetting resin having an imide bond comprises a polyimide, a polyetherimide, or combinations thereof; and
wherein the conductor is a rectangular conductor whose cross-sectional shape perpendicular to the longitudinal direction thereof is rectangular; and wherein, in the thickness of the innermost layer having contact with the conductor and locating on 4 sides that constitute a rectangle as the cross-sectional shape of said conductor, a thickness on both ends of at least one side excluding corners of the conductor is 1.2 to 2.0 times a thickness on a central part of said side.

11. The method of producing the insulated wire according to claim 10, further forming a thermoplastic resin layer by extrusion-forming of a composition comprising a thermoplastic resin on the thermosetting resin layer having the laminated structure.

12. A coil, comprising one or more of the insulated wire produced by the method according to claim 10.

13. A rotating electrical machine, comprising the coil according to claim 12.

14. An electrical or electronic equipment, having the coil according to claim 12.

* * * * *